(12) United States Patent
Panje et al.

(10) Patent No.: US 9,288,278 B2
(45) Date of Patent: Mar. 15, 2016

(54) PROVIDING USER CONTENT WITH STREAMED MEDIA CHUNKS

(71) Applicant: General Instrument Corporation, Horsham, PA (US)

(72) Inventors: Krishna Prasad Panje, Bangalore (IN); Murali Sahasranaman, Bangalore (IN); Sundar Murthy Tumuluru, Bangalore (IN); S N Karthick, Bangalore (IN); Somesh Saraf, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 323 days.

(21) Appl. No.: 13/830,616

(22) Filed: Mar. 14, 2013

(65) Prior Publication Data

US 2014/0280750 A1    Sep. 18, 2014

(51) Int. Cl.
*G06F 15/16* (2006.01)
*H04L 29/08* (2006.01)
*H04L 29/06* (2006.01)
*G06F 12/00* (2006.01)

(52) U.S. Cl.
CPC ...... *H04L 67/2804* (2013.01); *H04L 29/06027* (2013.01); *H04L 65/602* (2013.01); *H04L 65/608* (2013.01)

(58) Field of Classification Search
CPC .......... G06F 17/3002; G06F 17/30286; H04L 65/602; H04L 2463/101; H04N 21/458
USPC ................... 709/218–219, 223–229, 231, 250
See application file for complete search history.

(56) References Cited

U.S. PATENT DOCUMENTS

| | | | |
|---|---|---|---|
| 6,400,996 B1 * | 6/2002 | Hoffberg et al. | 700/83 |
| 7,466,334 B1 | 12/2008 | Baba | |
| 8,091,108 B2 | 1/2012 | Gupta | |
| 8,117,281 B2 | 2/2012 | Robinson et al. | |
| 8,230,458 B2 * | 7/2012 | Amento et al. | 725/13 |
| 8,239,546 B1 * | 8/2012 | McGowan | 709/227 |
| 2010/0205628 A1 * | 8/2010 | Davis et al. | 725/25 |
| 2010/0319031 A1 | 12/2010 | Lee et al. | |
| 2012/0005312 A1 * | 1/2012 | McGowan et al. | 709/219 |
| 2012/0246462 A1 * | 9/2012 | Moroney et al. | 713/151 |
| 2012/0297417 A1 * | 11/2012 | Philpott et al. | 725/34 |
| 2013/0080579 A1 * | 3/2013 | Gordon et al. | 709/217 |
| 2013/0080772 A1 * | 3/2013 | McGowan | 713/165 |

* cited by examiner

*Primary Examiner* — Zarni Maung
(74) *Attorney, Agent, or Firm* — Thomas A. Ward

(57) ABSTRACT

In a streaming server, companion content may be received and incorporated along with media that is streamed to clients. The companion content may originate from one of the clients, in some cases. In other cases, the companion content may originate from a source other than a client. The companion content may be any media relates to the media being streamed to the clients or directives that control the processing of the media being streamed to the clients.

18 Claims, 11 Drawing Sheets

```
...

<AdaptationSet mimeType="text/xml" lang="en">

<Representation id="2" bandwidth="512">
        <BaseURL>specific_content/companion.txt</BaseURL>
    </Representation>

</AdaptationSet>                              reference to
                                              companion content
<AdaptationSet>

<Representation
        mimeType="video/mp4"
        codecs="avc1.4D401E,mp4a.0x40"
        bandwidth="512000">
        <BaseURL>vid.mp4</BaseURL>
    </Representation>

</AdaptationSet>                  reference to media chunk

```
<?xml version="1.0" encoding="UTF-8"?>
<MPD
  ...
  <BaseURL>http://myserver/home_video_1/</BaseURL>
  <Period>
    <!-- video -->
    <AdaptationSet mimeType="video/mp4" group="1">
      <Role schemeIdUri="urn:mpeg:DASH:role:2011" value="main"/>
      <Viewpoint schemeIdUri="urn:mpeg:DASH:viewpoint:2011" value="vp1"/>
      <Representation id="11" bandwidth="1024000"> vid.mp4 </Representation>
    </AdaptationSet>
    <!--Companion content-->
    <AdaptationSet mimeType="text" group="2">
      <Role schemeIdUri="urn:mpeg:DASH:role:2011" value="main"/>
      <Role schemeIdUri="urn:mpeg:DASH:role:2011" value="supplementary"/>
      <Viewpoint schemeIdUri="urn:mpeg:DASH:viewpoint:2011" value="vp1"/>
      <Representation id="31" bandwidth="1024000">user_comp_comment_directive.txt</Representation>
    </AdaptationSet>
    ...
  </Period>
</MPD>
```

Fig. 7B

```xml
<?xml version="1.0" encoding="UTF-8"?>
<MPD
...

<BaseURL>http://myserver/home_video_1/</BaseURL>

<Period>

<!--companion_directive_text-->
  <AdaptationSet mimeType="text/xml" lang="en">
    <Representation id="2" bandwidth="512">
      <BaseURL>specific_content/companion.txt</BaseURL>
    </Representation>
  </AdaptationSet>

<!-- Video-->
    <AdaptationSet mimeType="video/mp4" group="1">
      <Role schemeIdUri="urn:mpeg:DASH:role:2011" value="main"/>
      <Viewpoint schemeIdUri="urn:mpeg:DASH:viewpoint:2011" value="vp1"/>
      <Representation id="11" bandwidth="1024000"> vid.mp4 </Representation>
    </AdaptationSet>

<!--Companion alternate video, could be indicated for a client by companion text-->
     <AdaptationSet mimeType="video/mp4" group="2">
       <Role schemeIdUri="urn:mpeg:DASH:role:2011" value="main"/>
       <Role schemeIdUri="urn:mpeg:DASH:role:2011" value="supplementary"/>
       <Viewpoint schemeIdUri="urn:mpeg:DASH:viewpoint:2011" value="vp1"/>
       <Representation id="31" bandwidth="1024000">vid_comp.mp4</Representation>
     </AdaptationSet>

</Period>
 ...
</MPD>
```

Fig. 8

```
#EXTM3U
  #EXT-X-MEDIA-SEQUENCE:1
  #EXT-X-TARGETDURATION:1

#EXT-X-KEY:METHOD=AES-128,URI="https://sample.com/key.txt"
  (#EXTINF:1,CCI=00)~902
  http://samle.com/segment-1.ts
  #EXTINF:1
  http://sample.com/segment-2.ts
  #EXTINF:1
  http://sample.com/segment-3.ts         references to
                                          media chunks
  (#EXTINF:1,CCI=11)~904
  http://samle.com/segment-4.ts
  #EXTINF:1
  http://sample.com/segment-5.ts
  #EXTINF:1
  http://sample.com/segment-6.ts
```

Fig. 9A

```
<MPD
  <Period>
    <AdaptationSet mimeType="video/mp4" group="1">
      <Role schemeIdUri="urn:mpeg:DASH:role:2011" value="main"/>
      <Representation id="11" bandwidth="1024000" (eas="21,1", >~922
        <BaseURL>video512.mp4</BaseURL>
      ...</Representation>
      <Representation id="12" bandwidth="512000">...</Representation>
      ...
    </AdaptationSet>

<AdaptationSet mimeType="video/mp4" group="1">
      <Role schemeIdUri="urn:mpeg:DASH:role:2011" value="alternate"/>
      <Representation id="21" bandwidth="1024000">
        (<BaseURL>eas_vid.mp4</BaseURL>)~924
      ... </Representation>

...

</AdaptationSet>
  </Period>
  ...
</MPD>
```

Fig. 9C

```xml
<?xml version="1.0" encoding="UTF-8"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011"
  type="static"
  mediaPresentationDuration="PT6158S"
  availabilityStartTime="2011-05-10T06:16:42"
  minBufferTime="PT1.4S"
  profiles="urn:mpeg:profile:dash:m2ts-simple"
  maxSegmentDuration="PT4S">

<BaseURL>http://cdn1.example.com/</BaseURL>
  <BaseURL>http://cdn2.example.com/</BaseURL>

<Period id="42" duration="PT6158S">
    <AdaptationSet
      mimeType="video/mp2t"
      codecs="avc1.4D401F,mp4a"
      frameRate="24000/1001"
      segmentAlignment="true"
      subsegmentAlignment="true"
      bitstreamSwitching="true"
      startWithSAP="2"
      subsegmentStartsWithSAP="2"
      cci="1,00" > //CCI value 00          ~912
      <ContentComponent contentType="video" id="481"/>
      <ContentComponent contentType="audio" id="482" lang="en"/>
      <ContentComponent contentType="audio" id="483" lang="es"/>
      <BaseURL>SomeMovie_</BaseURL>
      <SegmentTemplate
        media="$RepresentationID$_$Number%05$.ts"
        index="$RepresentationID$.sidx"
        initialisation="$RepresentationID$-init.ts"
        bitstreamSwitching="$RepresentationID$-bssw.ts"
        duration="4"
        startNumber="1"/>
      <Representation id="720kbps" bandwidth="792000" width="640" height="368"/>
      <Representation id="1130kbps" bandwidth="1243000" width="704" height="400"/>
      <Representation id="1400kbps" bandwidth="1540000" width="960" height="544"/>
      <Representation id="2100kbps" bandwidth="2310000" width="1120" height="640"/>
      <Representation id="2700kbps" bandwidth="2970000" width="1280" height="720"/>
      <Representation id="3400kbps" bandwidth="3740000" width="1280" height="720"/>
    </AdaptationSet>
  </Period>
</MPD>
```

Fig. 9B

PROVIDING USER CONTENT WITH STREAMED MEDIA CHUNKS

BACKGROUND

Adaptive streaming technology is becoming increasingly common in the industry. Adaptive streaming is a process that adjusts the quality of a video delivered to a user based on changing network conditions to maximize the viewer experience. A streaming server creates "variant bit rate streams" based on available network bandwidth for media to be streamed. The streaming server creates manifest files for the several bit streams. The clients can then select the correct bit stream based upon some algorithmic estimate of the delivery channel.

Streaming servers may be servers that manage home devices, trans-code content, and also manage bandwidth to provide optimal experience with client devices. Since these servers sit in the middle of the client network, they are well suited to accept content, condition the content for the prevailing conditions and existing bandwidth, and make that content available for all of the devices that are on the network. This same notion can be expanded to a more general cloud based server cluster.

Two of several streaming technologies include HTTP live streaming (HLS) and dynamic adaptive streaming of HTTP (DASH). For example, in HLS, a streaming server maintains different variant manifest files called "playlists" for every unique piece of media content. Each playlist is associated with different bit rates (this relates to display quality) indicating different files. Clients download these variant playlist files which are listed in a master playlist file. A single content is split into several file "chunks" which are specified within the playlist. The client then determines the available network bandwidth and plays chunks from the appropriate playlist one by one.

DASH is a standard that was developed by the Moving Picture Expert Group (MPEG). DASH provides a single manifest file called a media presentation description (MPD) that lists all of the variant bit rate files. DASH is hierarchical with respect to the media segment structures and universal resource identifier (URI) from which to locate them, but DASH does not quote subsequent MPD's as compared to HLS, which lists variant playlist from a master playlist.

BRIEF DESCRIPTION OF THE DRAWINGS

FIGS. 7A, 7B, 8, 9A, 9B, and 9C are illustrative examples of manifest files in accordance with principles of the present disclosure.

DETAILED DESCRIPTION

Disclosed embodiments relate to providing for companion content in an architecture that provides live streaming of media content. In the following description, for purposes of explanation, numerous examples and specific details are set forth in order to provide a thorough understanding of embodiments of the present disclosure. Particular embodiments as expressed in the claims may include some or all of the features in these examples alone or in combination with other features described below, and may further include modifications and equivalents of the features and concepts described herein.

In some embodiments, a method in a server includes receiving media to be streamed. The received media may be partitioned to create a plurality of media chunks. Manifest files are created which reference the media chunks, which may then be provided to clients. In accordance with the present disclosure, the server may receive companion content from a client. The companion content may be included in one or more manifest files based on a media chunk associated with the companion client. The modified manifest files may then be provided to a second client, which may generate output based on the companion content.

In some embodiments, a server system may comprise a communication interface for connection to one or more communication networks, a data store, and a processing device. The data store may include code to control operation of the processing device. The server system, per operation of the processing device, may receive media to be streamed. A plurality of media chunks may be produced from the received media along with a plurality of manifest files that reference one or more of the media chunks. The received media may be streamed via the manifest files and media chunks to clients. The server system may receive companion content from a client that relates to when a media chunk was streamed. Some of the manifest files, identified using that media chunk, may be modified to incorporate the companion content, so that a second client can generate output based on the companion content when the second client receives a modified manifest file.

In some embodiments, a non-transitory computer-readable storage medium containing computer executable instructions for controlling a computer processor to receive media to be streamed. The computer processor may generate a plurality of media chunks from the media received and generate a plurality of manifest files which reference the plurality of media chunks. The received media can be streamed by clients who receive the manifest files. The computer processor may receive companion content from a client, and in response modify one or more manifest files to reference the companion content. A client receiving a modified manifest file may then generate output based on the companion content referenced in the modified manifest file.

Figure 1:
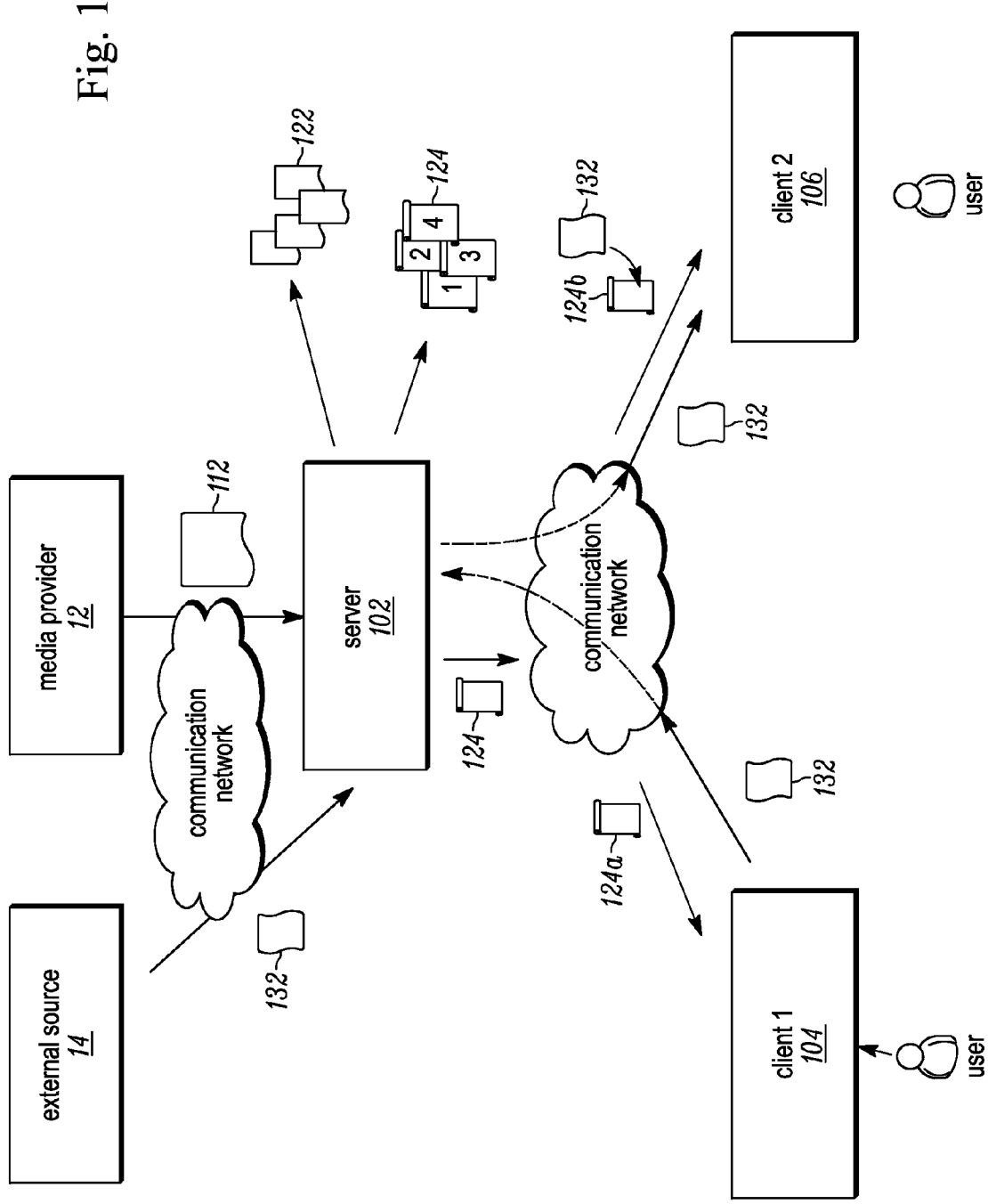
FIG. 1 is a high level system diagram in accordance with principles of the present disclosure.

Referring to FIG. 1, in some embodiments, a live streaming system may include a streaming server 102 providing media to several clients 104, 106. The streaming server 102 may receive media content 112 from a media provider 12. The media provider 12 may be any producer of media content 112. At one end of the spectrum, for example, the media provider 12 may be a movie or television production company that provides movies or television shows as media content 112 to a content distributor; e.g., streaming server 102. At the other end of the spectrum, the media provider 12 may be an individual who creates a video and then posts that video as media content 112 on a video sharing website; e.g., streaming server 102. In other embodiments, the live streaming system may be a home entertainment system that includes streaming server 102.

The streaming server 102 may receive the media content 112 and process the media content in accordance with a suitable live streaming format. Generally, the media content 112 is partitioned ("chunked") into chunks ("media chunks") 122. The streaming server 102 may produce manifest files 124 which reference the media chunks 122. For example, the manifest files 124 may store locations (e.g., URI, directory path, etc.) where the media chunks are stored, information that identify characteristics of the media chunks, and so on. In some embodiments, the streaming server 102 may produce media chunks 122 in accordance with the HTTP live streaming (HLS) definition, where media chunks are referenced in manifest files called "playlists". In other embodiments, the streaming server 102 may produce media chunks 122 in accordance with the dynamic adaptive streaming of HTTP (DASH) standard, where media chunks are referenced in manifest files called media presentation description (MPD) files. The streaming server 102 may provide the manifest files 124 to clients 104, 106. The clients 104, 106 may then play back the media content 112 by accessing media chunks 122 that are referenced in one or more of the respective manifest files 124a, 124b.

In accordance with principles of the present disclosure, the streaming server 102 may receive "companion content" 132 from a client 104 or an external source 14. In some embodiments, for example, the companion content 132 allows a user to associate some media with the media content 112 that is being played back at the client 104. For example, the companion content 132 may be a text message that the user enters as the client 104 is playing back the media content 112. In other embodiments, the companion content 132 may be a message from an external source 14. More generally, the companion content 132 may be audio, video, audio-visual media, images, etc. as well as text. In other embodiments, the companion content 132 may be a directive such as parental controls, copy protection rules, and the like. These aspects of the present disclosure will be discussed in more detail below.

In accordance with principles of the present disclosure, the streaming server 102 may distribute companion content 132 received from client 104 (or from external source 14) to other clients. In some embodiments, for example, the streaming server 102 may incorporate a reference to the companion content 132 (e.g., storage location) into a manifest file 124b that is then downloaded to a client 106. The client 106 may access the companion content 132 just like any other media chunk, by processing the manifest file 124b. Alternatively, the streaming server 102 may incorporate the companion content 132 itself in the manifest file. Such hard coding of the companion content 132 in the manifest file 124 may be suitable if the companion content is text data or a directive. These aspects of the present disclosure will be discussed in more detail below.

Figure 2:
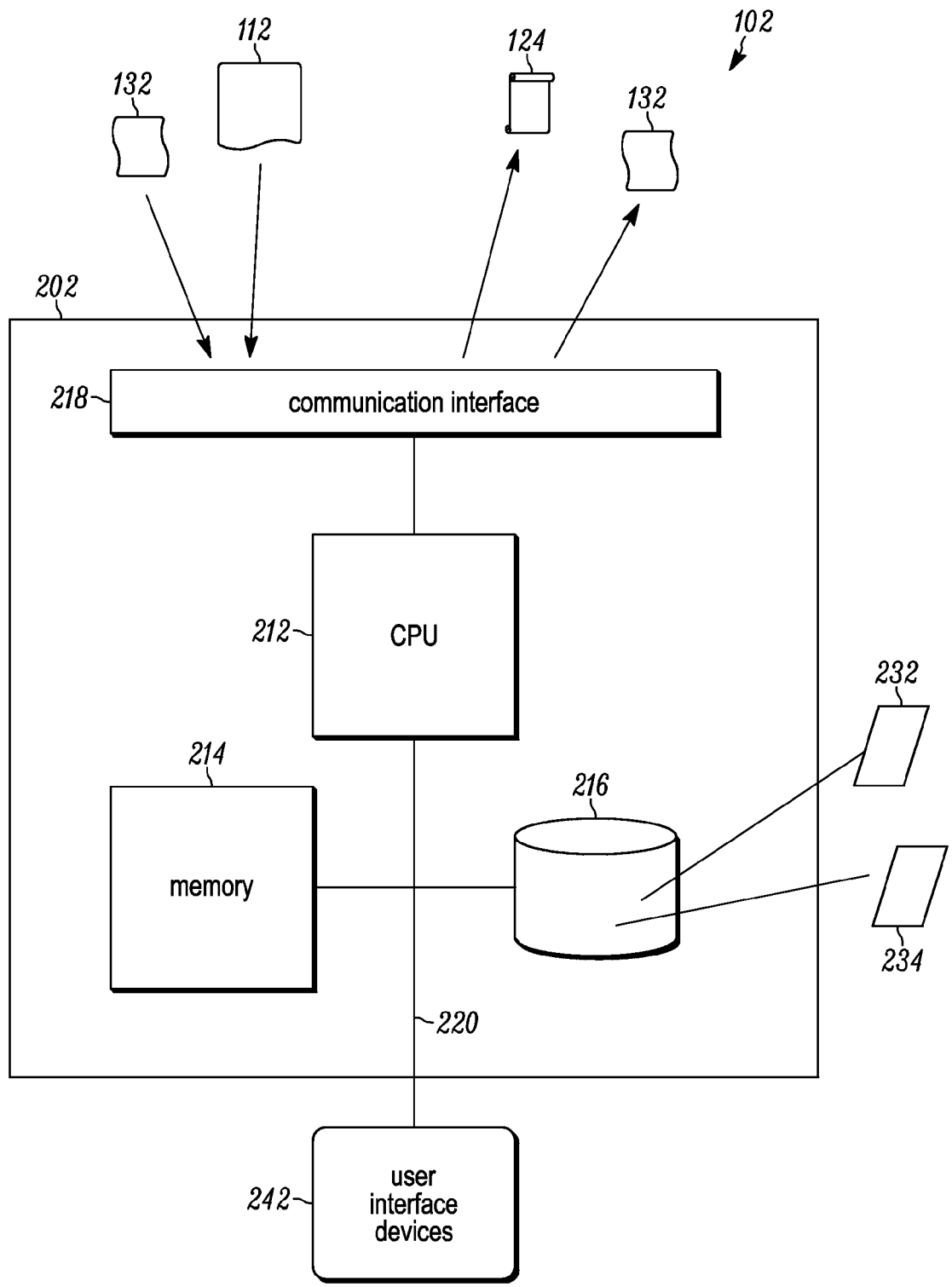
FIG. 2 is a high level block diagram of components in a streaming server in accordance with principles of the present disclosure.

Referring to FIG. 2, a high level block diagram of a streaming server in accordance with an illustrative embodiment of the present disclosure may include a computer system 202 configured and programmed to operate as streaming server 102, for example. The computer system 202 may include a central processing unit (CPU) 212 or other similar data processing component. The CPU 212 may be a single processor or a multiprocessor subsystem. The computer system 202 may include various memory components. For example, the memory components may include a volatile memory 214 (e.g., random access memory, RAM) and a data storage device 216. A communication interface 218 may include hardware and software to communicate with the media provider 12 and external source 14 over suitable communication networks such as the Internet, a local area network (LAN), and so on. The communication interface 218 may further include hardware and software to communicate with clients 104, 106 over the Internet, or using a Wi-Fi connection in a local home subnet, and so on. An internal bus 220 may interconnect the components comprising the computer system 202.

The data storage device 216 may comprise a non-transitory computer readable storage medium having stored thereon computer executable program code 232. The computer executable program code 232 may be executed by the CPU 212 to cause the CPU to perform steps in accordance with the present disclosure, for example the steps set forth in FIG. 4. The data storage device 216 may store various data 234 such as media chunks 122, manifest files 124, and any other data described herein.

A user (e.g., an administrative user) may interact with the computer system 202 using suitable user interface devices 242. Devices may include, for example, input devices such as a keyboard, a keypad, a mouse or other pointing device, and output devices such as a display.

Figure 3:
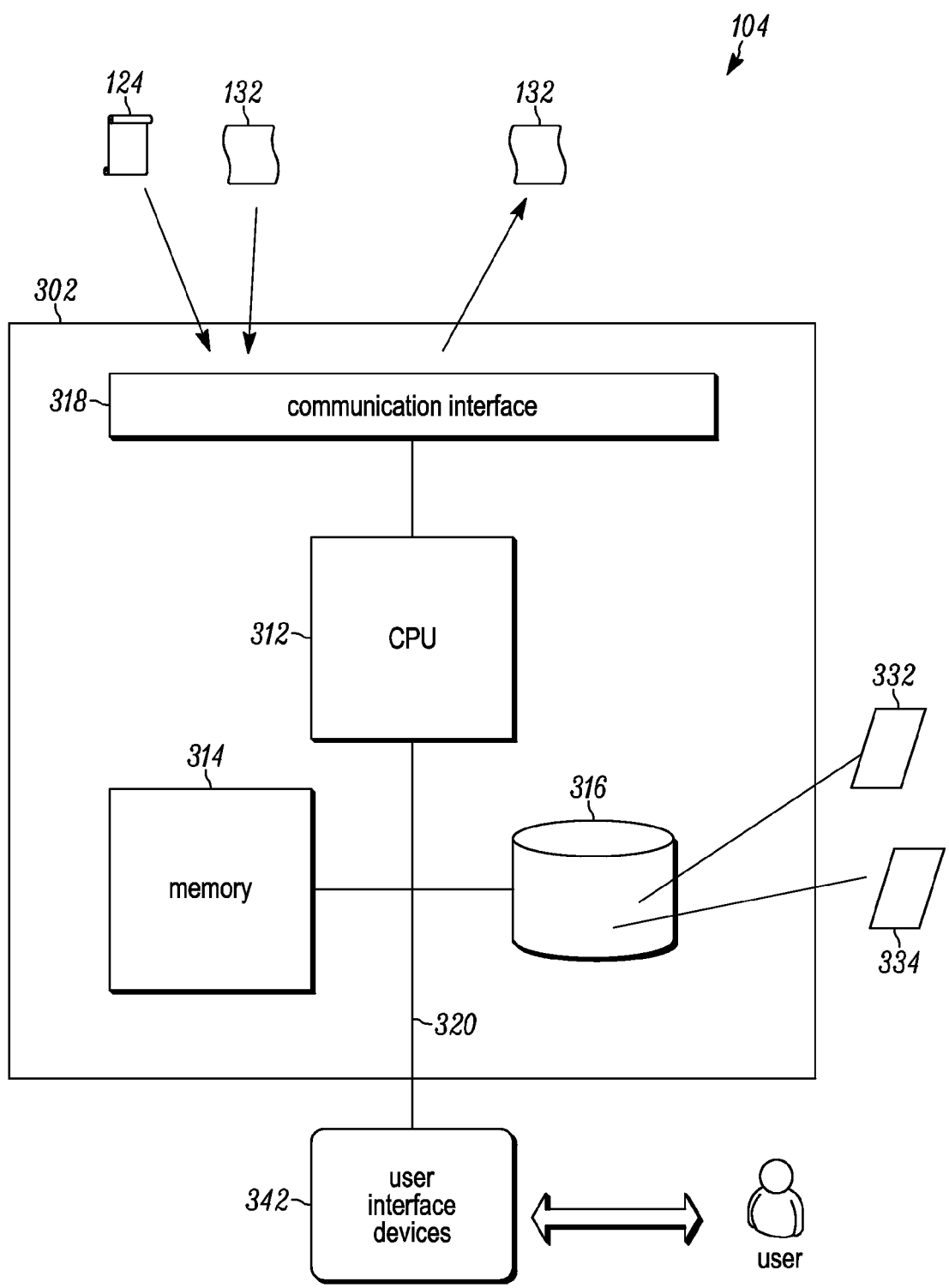
FIG. 3 is a high level block diagram of components in a client in accordance with principles of the present disclosure.

Referring to FIG. 3, a high level block diagram of a typical client device in accordance with an illustrative embodiment of the present disclosure may include a computer system 302 configured and programmed to operate as client 104, for example. The computer system 302 may include a central processing unit (CPU) 312 or other similar data processing component. The CPU 312 may be a single processor or a multiprocessor subsystem. The computer system 302 may include various memory components. For example, the memory components may include a volatile memory 314 (e.g., random access memory, RAM) and a data storage device 316. A communication interface 318 may be provided to allow the computer system 302 to communicate with the streaming server 102 over a communication network such the Internet, for example, or using a Wi-Fi connection in a local home subnet. An internal bus 320 may interconnect the components comprising the computer system 302.

The data storage device 316 may comprise a non-transitory computer readable storage medium having stored thereon computer executable program code 332. The computer executable program code 332 may be executed by the CPU 312 to cause the CPU to perform steps in accordance with the present disclosure, for example the steps set forth in FIG. 5. The data storage device 316 may store data 334 such as received manifest files 124, received companion content 132, and any other data described herein. An illustrative embodiment of a client may be a computer tablet running a media streaming application.

The user may interact with the computer system 302 using suitable user interface devices 342. Devices may include, for example, input devices such as a keyboard, a keypad, a mouse or other pointing device, and output devices such as a display.

Figure 4:
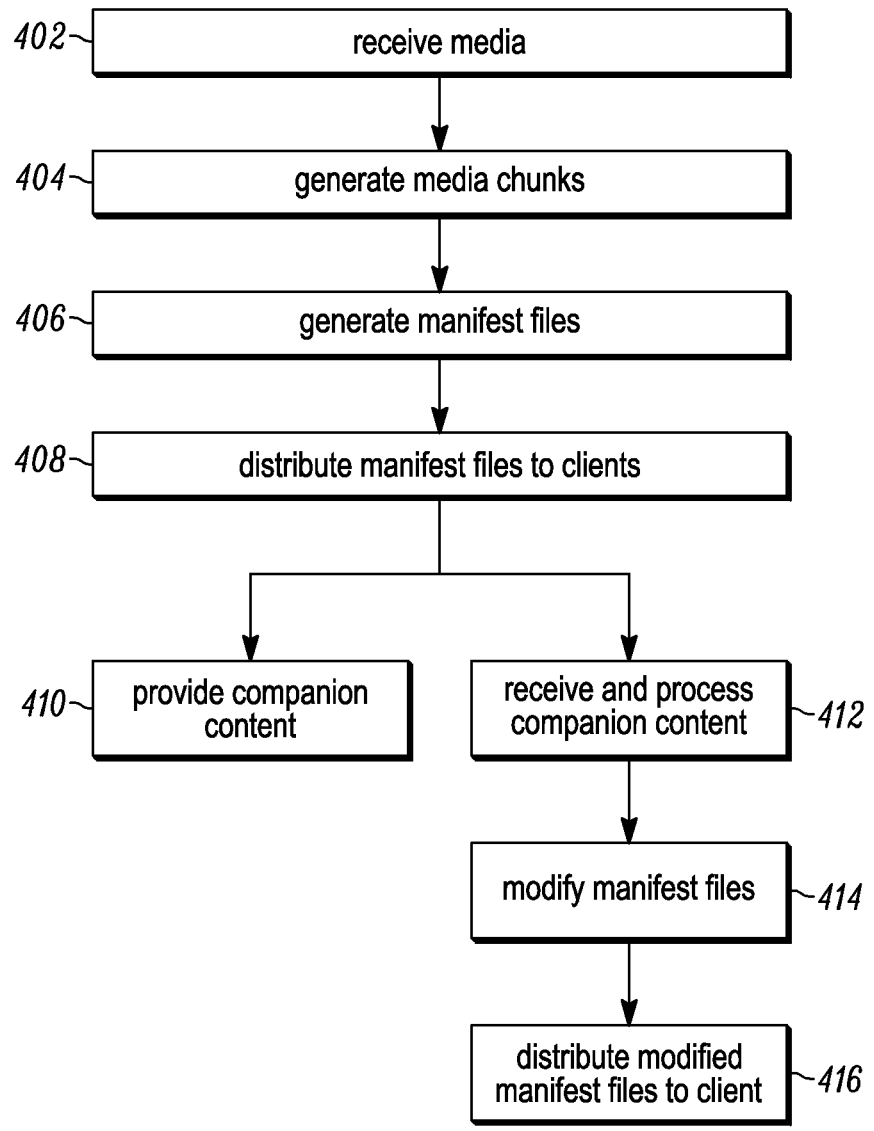
FIG. 4 is a process flow illustrating, at a high level, processing in a streaming server in accordance with principles of the present disclosure.

Referring to FIG. 4, the discussion will turn to additional details relating to the processing that occurs in the streaming server 102 in accordance with the present disclosure. At block 402, the streaming server 102 may receive media content 112 from media provider 12. The media content 112 may be any media that is suitable for streaming to client systems; e.g., pre-recorded media such as movies, live media such as a sports broadcast, and so on.

At block 404, the streaming server 102 may process the media content 112 to generate media chunks 122 in accordance with a live streaming process such as HLS or DASH. Typically, the media content 112 is divided into a set of media chunks 122 so that the media content can be delivered in segments. In addition, the streaming server 102 may produce several such sets of media chunks 122 for the same media content 112. In some embodiments, for example, each set of media chunks 122 may differ from other sets of media chunks 122 in terms of the needed bandwidth to download the media chunks. In other embodiments, the streaming server 102 may generate different sets of media chunks 122 to accommodate different business arrangements that a content provider may have with its clients, and so on. The generated media chunks 122 may be stored for subsequent delivery (streamed) to clients.

At block 406, the streaming server 102 may generate manifest files 124 for delivering the media chucks 122 to its clients, for example, in accordance with a streaming format such as HLS or DASH. The manifest files 124 may include a list of references (e.g., storage locations such as URI link, directory pathnames, etc.) to the media chunks 122, and may include other supporting information such as bandwidth requirements, duration of the media chunks, and so on.

At block 408, the streaming server 102 may distribute the manifest files 124 to the various clients. In some embodiments, the media content 112 may be delivered to the client in several segments. For example, the streaming server 102 may provide a first manifest file 124 listing a subset of media chunks 122 that comprise a first segment of the media content 112. The streaming server 102 may then provide the next manifest file 124 identifying the next subset of media chunks 122 comprising the next segment of the media content 112, and so on. This approach is suitable for live content, but may very easily be used to deliver pre-recorded content as well, for example, in ten minute segments.

At block 410, the streaming server 102 may stream media chunks to clients when clients identify media chunks in the manifest files and request the streaming server to download those media chunks.

At block 412, in accordance with the present disclosure, the streaming server 102 may receive companion content 132 from a client (e.g., client 104, FIG. 1). For example, in a home streaming network it might desirable to provide a way to communicate between users watching streamed media (media content 112) in different rooms of the home to allow users to communicate with each other. The communication may be something that is related to what the user is watching, or may any arbitrary communication. The companion content 132 that constitutes the communication can be user comments, quotes, audio/video or audio clips, images, text, and so on.

In some embodiments, companion content 132 may originate from a source (e.g., external source 14, FIG. 1) other than a client. For example, the source may be an Emergency Alert System (EAS) that issues emergency alert messages, or the source may be the content provider that issues messages related to business events, and so on.

In some embodiments, the companion content 132 may comprise "directives" instead of audio, visual, or textual information. Directives generally apply to how the media chunks are handled, rather than conveying information to the user. Examples of directives include, for instance, parental control information, copy protection rules, etc. Directives may be hard coded into the manifest file 124, or may be contained in a media file and delivered as a media chunk.

Further in accordance with the present disclosure at block 412, the streaming server 102 may "condition" the companion content 132 in order to accommodate the client's streaming capability; e.g., by taking into account bandwidth and bit rate constraints, and the like. The companion content 132 may be chunked into media chunks suitable for delivery to the clients (e.g., to match the play-out duration of the media content 112), and so on. In some embodiments, if the companion content 132 is a text message, the streaming server 102 may incorporate that text in a media chunk, along with other information that a receiving client may use to present the text.

In order to be effective and meaningful, the companion content 132 can be synchronized with respect to the media content 112 that is being streamed to the other clients. For example, a scene in a movie may trigger a memory in a user, who may then upload companion content relating to the triggered memory (e.g., a clip from a home video) to the streaming server 102. The clip should be around the time that the same scene is being viewed by other users. Accordingly, in some embodiments, the companion content 132 that is generated by the client 104 may include information that identifies one or more media chunks associated with the companion content; e.g., a time index.

At block 414, the streaming server 102 may modify one or more manifest files 124 to incorporate the companion content 132 into the manifest file, for example, by including references to where the companion content is stored. In some embodiments, the companion content 132 may be directly incorporated into the manifest file 124, for example, if the companion content is a directive. By incorporating the companion content 132 into the manifest files 124, the streaming server can synchronize the companion content with respect to when in the media content 112 the companion content was introduced. For example, if user A specified companion content at 32:31 minutes into a movie, then the streaming server 102 may incorporate the companion content into manifest files 124 that reference media chunks having time indices at or close to the 32:31 time index. Thus, when user B downloads a modified manifest file, the companion content can be presented along with the media chunk at or neat time index 32:31.

At block 416, the streaming server 102 may distribute the modified manifest files to clients when clients download manifest files to play back the media content 112.

Figure 5:
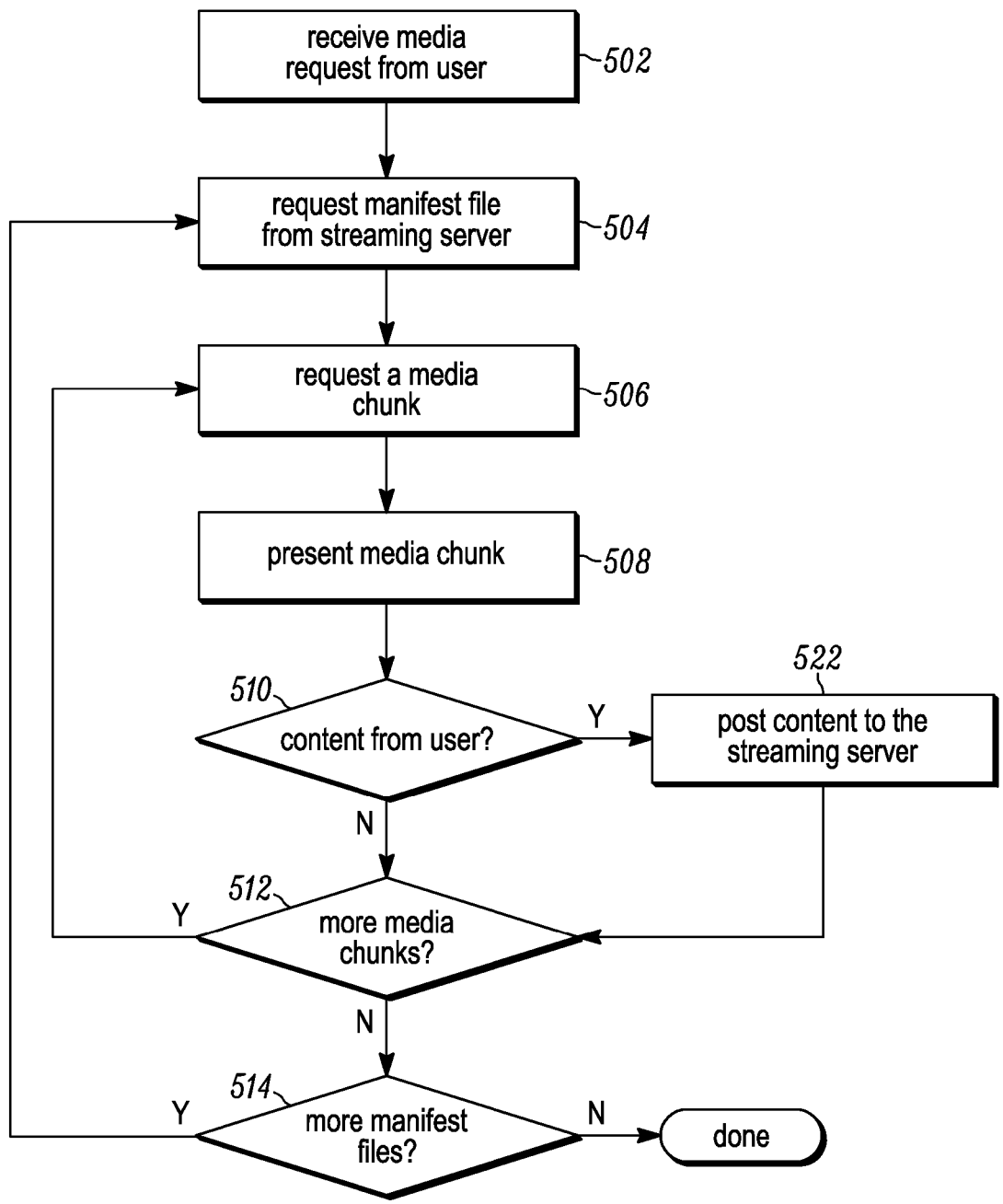
FIG. 5 is a process flow illustrating, at a high level, processing in a client in accordance with principles of the present disclosure.

Referring to FIG. 5, the discussion will turn to additional details relating to the processing that occurs in a client (e.g., client 104, FIG. 1) in accordance with the present disclosure wherein the client posts companion content 132 to the streaming server 102. At block 502, a user wanting to view some media may make a request to the client 104, for example, by navigating in a browser or other suitable interface to identify, select, and request the media (e.g., media content 112, FIG. 1). At block 504, the client 104 may communicate with the streaming server 102 to obtain an initial manifest file 124 for the first segment of the requested media. At block 506, the client 104 may process the manifest file 124 and request a media chunk, identified in the manifest file, from the streaming server 102. In response, the streaming server 102 may access and stream the requested media chunk to the client 104. At block 508, the client 104 may present the media chunk, for example, by displaying video component of the media chunk on a display device and playing the audio component over a speaker system.

In accordance with the present disclosure, the client 104 may receive companion content 132 from the user as the user is viewing the media. For example, the client 104 may provide a suitable user interface to allow the user to input the companion content 132. The user may specify a location where their companion content 132 is stored; e.g., the companion content may be a video clip stored on the client, or on another computer that the client can access, and so on. The companion content 132 may comprise audio and/or visual content created by the user; e.g., the client 104 may have digital recording capability. The user may simply type a message, and so on. If, at block 510, the client 104 receives companion content 132 from the user, then at block 522 the client may communicate the companion content to the streaming server 102.

At block 512, if the manifest file 124 identifies additional media chunks to be streamed from the streaming server 102, then processing continues with block 506 to stream the next media chunk. After the last media chunk listed in the manifest file 124 has been streamed, then at block 514, the client 104 may determine if there are any more manifest files for the requested media (e.g., the manifest file may include a tag or some other indication that there is another manifest file). If so, then processing continues with block 504 to obtain the next manifest file to play the next segment of the requested media.

Figure 6:
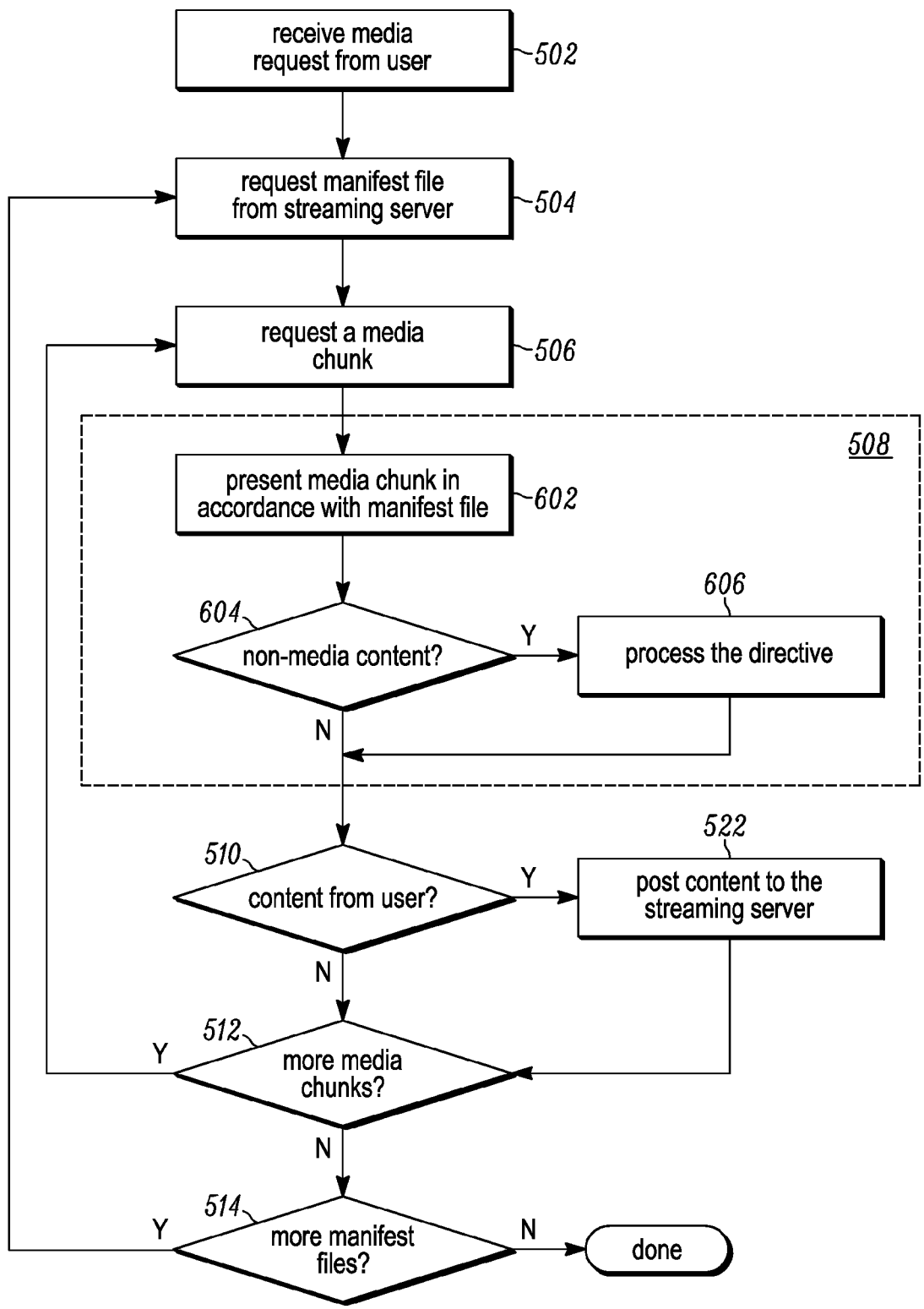
FIG. 6 shows additional detail of the processing in FIG. 5.

Referring to FIG. 6, further details of the processing for presenting media chunks (block 508, FIG. 5) will be discussed. In particular, the discussion will turn to how a client (e.g., client 106, FIG. 1) may process companion content 132 that is received from the streaming server 102 in accordance with the present disclosure. Processing blocks shown in FIG. 6 that are common to FIG. 5 have been identified with the same reference numerals and are described in the description of FIG. 5.

As explained above, the streaming server 102 may process the companion content 132 as it would process any media chunk, for example, adding a reference in the manifest file 124 that indicates the location of the companion content, or hard coding the companion content (e.g., a directive) in the manifest file. When client 106 requests a media chunk at block 506 that happens to be companion content 132, the streaming server 102 will stream the companion content to the client. Accordingly, at block 602, the client 106 may present the companion content 132 to the user as it would any other media chunk. The companion content 132 can thus be streamed to the client 106 without any special processing by the client.

As explained above, companion content 132 may be incorporated directly into the manifest file, for example, when the companion content is a text message, a "directive", or other non-media content. Accordingly, if the client 106 determines at block 604 that the manifest file 124 includes non-media type companion content 132, then such companion content may be processed at block 606. For example, if the companion content 132 is a text message, then the client 106 may simply display or otherwise present the text message to the user.

The companion content 132 may be a directive. In accordance with some embodiments of the present disclosure, a directive may be any kind of control that dictates how a media chunk is to be processed and/or presented to the user. For example, the directive may comprise parental control information to limit what children can view. A more general view control directive may specify particular users who can or cannot view media, or may specify particular clients that can receive the media, when the media can be viewed, and so on.

The directive may comprise copy protection rules that limit or otherwise constrains how the media chunk is stored. For example, Digital Rights Management (DRM) policies applicable to the requested content may require copy control information. The directive may include image constraint tokens (ICT) to force downsampling of high-definition video. The directives may include controls to implement Analog Protection System (APS) policies on certain media, and so on.

Directives may be embedded (hard coded) in the manifest file 124. For example, in an HLS system, the #EXTINF tag in an HLS playlist may be extended to include new fields to support directives. For example, the #EXTINF tag may implement the following copy protection rules:

EXTINF:1, CCI=<CCI Value>, APS=<APS Value>, ICT=<ICT Value> where,

CCI is a tag for copy control information

<CCI Value> is value the indicates the copy control to enforce; e.g., "11" may indicate never copy, "10" copy one generation, "01" no more copies, and "00" copy freely APS is a tag for analogue protection system <APS Value> is value the indicates the type of analogue protection to enforce ICT is a tag for image constraint token <ICT Value> is value the indicates the type of image constraint to impose Alternatively, directives may be specified in the comment lines in an HLS playlist. For example, the foregoing copy protection rules may appear as comments in the playlist:

CCI=<CCI Value>, APS=<APS Value>, ICT=<ICT Value>

The client 106 may parse or otherwise scan the playlist and take appropriate action when a directive is detected; e.g., in an #EXTINF tag or in a comment line.

In a DASH MPD, new attributes may be defined to support directives. For example, some common attributes include:

| Element or Attribute Name | Use | Description |
| --- | --- | --- |
| Common attributes and elements | | |
| @audioSamplingRate | O | Either a single decimal integer value specifying the sampling rate or a whitespace separated pair of decimal integer values specifying the minimum and maximum sampling rate of the audio media component type. The values are in samples per second. |
| @mimeType | M | specifies the MIME type of the concatenation of the Initialisation Segment, if present, and all consecutive Media Segments in the Representation. |
| @codecs | M | specifies the codecs present within the Representation. The codec parameters shall also include the profile and level information where applicable. The contents of this attribute shall conform to either the simp-list or fancy-list productions of RFC6381, Section 3.2, without the enclosing DQUOTE characters. The codec identifier for the Representation's media format, mapped into the name space for codecs as specified in RFC6381, Section 3.3, shall be used. |
| FramePacking | 0 . . . N | specifies frame-packing arrangement information of the video media component type. When no FramePacking element is provided for a |

-continued

| Element or Attribute Name | Use | Description |
|---|---|---|
| | | video component, frame-packing shall not used for the video media component. |
| AudioChannelConfiguration | 0 . . . N | specifies the audio channel configuration of the audio media component type. |

Legend:
For attributes:
M = Mandatory,
O = Optional,
OD = Optional with Default Value,
CM = Conditionally Mandatory.
For elements:
<minOccurs> . . . <maxOccurs> (N = unbounded)
Elements are bold;
attributes are non-bold and preceded with an @.

In accordance with the present disclosure, the MPD may provide the foregoing copy protection rules by defining the following new attribute in DASH:

| Element or Attribute Name | Use | Description |
|---|---|---|
| Common attributes and elements | | |
| @cci | O | First mentions of CCI, APS or ICT followed by value CCI = 1, APS = 2, ICT = 3, Most restrictive ORed = 4; Example "1, 0x00, 0x01, 0x10, 0x11" Most restrictive Example "4, 1, 0x01" - this representation has CCI with most restrictive as 0x01. |

As another example, the following EAS directive may be defined in DASH to accommodated emergency alert messages:

| | | |
|---|---|---|
| @eas | O | Indicates EAS type representation @id, EAS_TYPE = 1/2/3 for EAS-CO, EAS-FT, SCTE18 respectively Example: "10, 1" means chunk with representation id 10 is EAS-CO. |

One of ordinary skill in the art will appreciate that other directives may be defined and specified in manifest files (e.g., HLS playlist, DASH MPD) in similar fashion.

In some embodiments, a directive need not be associated with just one media chunk. A directive may become effective upon being detected by the client 106. The directive may then be applied to the processing of each subsequent media chunk until another directive is encountered. For example, a copy protection directive may apply to the entirety of the requested media (e.g., in HLS, by extending the #EXT-X-STREAM-INF); likewise, with a parental control directive.

In other embodiments, a directive that appears in a manifest file 124 need not be associated with any media chunks 122 identified in the manifest file. For example, the streaming server 102 may receive an emergency alert from an external source 14 such as the Emergency Alert System. The streaming server 102 pass the alert to the clients by inserting a directive in the manifest file that represents the emergency alert signal. When the client 106 detects the directive, the client may present an appropriate display to alert the user, or may ignore the directive, or may perform any other suitable action. As another example, the streaming server 102 may receive a notification from an Internet service provider (i.e., an external source 14), which can then be provided to the client 106 via a suitably defined directive.

The discussion will now turn to some examples of manifest files in accordance with the present disclosure. FIG. 7A, for instance, illustrates a simple example of a portion of a manifest file (in this case, a DASH MPD) that includes a reference to companion content. In this example, the companion content is text ("companion text") that is stored in a media file called "companion.txt" (recall that such companion text could be "hardcoded" into the manifest file as an alternative). The companion text is associated with a media chunk identified as "vid.mp4", presumably because a user entered the text around the time they were watching the "vid.mp4" media chunk. Accordingly, the companion text can be synchronized with the "vid.mp4" media chunk, for example, by being listed in the MPD near the media chunk so that the companion text will be presented with the video. In this particular example, the companion text is listed in the MPD before the media chunk, but it could be listed after the media chunk. In fact, depending on the situation, the companion text may be separated from the "vid.mp4" media chunk by one or more media chunks.

As another example, FIG. 7B shows an alternative way to incorporate the companion content into the MPD. Here, the companion content is incorporated as a role/value element in the MPD.

FIG. 8 illustrates an example of a segment of an MPD that includes companion text stored in a file called "companion-.txt" and companion video stored in a file called "vid_comp.mp4". This example illustrates a scenario where the companion video is an alternate to the media chunk "vid.mp4" generated from the user-requested media. The companion text can be displayed to the user to indicate that alternate video is available, giving the user an opportunity to choose playing the alternate video.

FIGS. 9A-9C show illustrative manifest files in accordance with the present disclosure. FIG. 9A shows an example of a portion of manifest files, specifically an HLS playlist, that incorporates directives 902 and 904. A client (e.g., client 106, FIG. 1) can scan the playlist from top to bottom and process each part of the playlist, as explained above in FIG. 6. For example, as the client encounters each reference to a media chunk, the client will obtain and display the media chunk to the user. Thus, the media chunk http://samle.com/segment-1.ts may be encountered first, then media chunk http://samle.com/segment-2.ts, followed by media chunk http://samle.com/segment-3.ts, and so on.

The directives 902, 904 shown in FIG. 9A are examples of copy control information directives. Using the description above, directive 902 designates "copy free" control and directive 904 designates "never copy" control. The example in FIG. 9 illustrates that directives can be associated with individual media chunks or a range of media chunks. In an HLS playlist, for example, a directive's association with one or more than one media chunk can be controlled by its placement among the referenced media chunks. Thus, in the FIG. 9A, the example shows that directive 902 will apply to the following media chunks identified in the manifest file:

http://samle.com/segment-1.ts
http://samle.com/segment-2.ts
http://samle.com/segment-3.ts When the client encounters directive 904, the client will apply the "copy never" control to media chunks:

http://samle.com/segment-4.ts
http://samle.com/segment-5.ts
http://samle.com/segment-6.ts until another copy protection rule directive is encountered.

FIG. 9B illustrates another example of incorporating a directive in a manifest file, where the manifest file is of the MPD kind. Here, directive 912 is a copy protection directive that is implemented as a new attribute (discussed above) called "cci". The directive is shown hard coded in the MPD.

FIG. 9C illustrates an example of companion content that is an emergency alert signal incorporated in an MPD. The MPD includes a directive 922 called "eas". A companion video called "eas_vid.mp4" accompanies the directive and may contain a suitable alert message. How the emergency alert is presented to the user is under the control of the client. For example, the client may ignore it altogether, or the client may stop whatever is being displayed and present a suitable emergency alert screen to the user.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The invention claimed is:

1. A method in a server for providing video media data comprising operating the server to perform steps of:
    receiving video media to be streamed to one or more client devices that provide the video data to a video player;
    generating a plurality of media chunks from the video media received;
    generating a plurality of manifest files which reference the plurality of media chunks;
    providing at least some of the manifest files to the one or more client devices, whereby said one or more clients can stream some of the media chunks using the manifest files;
    receiving companion content from a first client in the client devices, wherein the companion content is associated with a media chunk streamed by the first client;
    modifying one or more of the manifest files to reference the companion content, said one or more manifest files being identified based on the associated media chunk streamed by the first client; and
    providing a manifest file that contains a reference to the companion content to at least a second client in the client devices, wherein the second client generates output based on the companion content referenced in the manifest file.

2. The method of claim 1 further comprising providing the companion content to the second client.

3. The method of claim 1 wherein the companion content is audio and/or visual data and the reference to the companion content in the manifest file provided to the second client is a link to a media file containing the audio and/or visual data.

4. The method of claim 1 wherein the companion content is textual data and the reference to the companion content in the manifest file provided to the second client is the text that comprises the textual data.

5. The method of claim 1 further comprising the server receiving external companion content from a source other than a client.

6. The method of claim 1 wherein the reference to the companion content in the manifest file is applicable to a media chunk in the manifest file provided to the second client.

7. The method of claim 6 wherein the companion content is a directive that directs the client how to process the associated media chunk.

8. The method of claim 6 wherein the companion content comprises parental control information which controls the display of the associated media chunk.

9. The method of claim 6 wherein the companion content comprises copy protection rules relating to the associated media chunk.

10. The method of claim 1, wherein the modification of the manifest files enables the second client to play the video content.

11. A server system for providing video media data to one or more client devices comprising:
    a communication interface for connection to one or more communication networks;
    a data store having stored thereon computer executable program code; and
    a processing device, wherein the computer executable program code is configured to cause the processing device to:
        receive via the communication interface the video media data to be streamed;
        generate a plurality of media chunks from the media received, wherein at least some of the plurality of media chunks are stored on the data store;
        generate a plurality of manifest files which reference the plurality of media chunks;
        provide via the communication interface at least some of the manifest files to the one or more client devices, whereby said one or more client devices can stream some of the media chunks using the manifest files;
        receive via the communication interface companion content from a first client in the client devices, wherein the companion content is related to when a media chunk was streamed by the first client;
        modify one or more of the manifest files to reference the companion content, said one or more manifest files being identified based on the associated media chunk streamed by the first client; and provide via the communication interface a manifest file that contains a reference to the companion content to at least a second client in the client devices, wherein the second client generates output based on the companion content referenced in the manifest file.

12. The system of claim 11 wherein the computer executable program code is further configured to cause the processing device to receive external companion content from a source other than a client.

13. The system of claim 11 wherein the companion content is a directive that directs the client how to process the associated media chunk.

14. The system of claim 13 wherein the directive is hard coded in the manifest file.

15. The system of claim 13 wherein the directive is incorporated as media chunk that is referenced in the manifest file.

16. The system of claim 13 wherein the directive comprises parental control information which controls the display of the associated media chunk.

17. The system of claim 13 wherein the directive comprises copy protection rules relating to the associated media chunk.

18. The method of claim 11, wherein the modification of the manifest files enables the second client to play the video content.

* * * * *